2,043,811

UNITED STATES PATENT OFFICE 2,043,811

ART OF WELDING AND FUSING METAL

Robert M. Rooke, Jersey City, N. J., and Frederick C. Saacke, New York, N. Y., assignors to Air Reduction Company, Incorporated, New York, N. Y., a corporation of New York No Drawing. Application November 12, 1934, Serial No. 752,700

9 Claims. (Cl. 113—112)

This invention relates to the art of fusing metals by the application of a flame burning acetylene. More especially, the invention relates to the melting or welding of alloy steels which are unsuited for welding with the oxyacetylene flame. The behavior of molten stainless chromium-bearing steels under the oxyacetylene flame is such that it is difficult to make welds in the manner so successful with ordinary steels, and the resulting welds are deficient in ductility and tensile strength. Similarly, oxyacetylene welding is unsatisfactory when applied to the deposit of stainless steel on a ferrous base of different character, as in surfacing an ordinary steel with stainless steel. If these alloys are melted with the oxyacetylene flame for the purpose of making castings, the castings are apt to be imperfect or lacking in requisite properties.

We have ascertained that it is possible to melt such alloys without injury and to weld and cast them with a high degree of success if, instead of the oxygen-acetylene mixture, an oxygen-nitrogen-acetylene mixture, in which the oxygen and nitrogen are in proper proportions, is used. It has been found, also, that by welding stainless steels with a flame mixture of this character no flux is required.

Experiments which we have made show that, in order to accomplish the above results, the ratio of oxygen to nitrogen in the mixture must not be greater than 75:25. Surprisingly enough, within limits, the weldability of alloys such as "18-8" stainless steel increases directly with the nitrogen content of the welding gas mixture supplied to the flame; but at a ratio of 30 volumes of oxygen to 70 volumes of nitrogen the alloy becomes practically unweldable, consequently the nitrogen concentration must not exceed, and should be kept below, that relation. Tests have demonstrated that both the tensile strength and the ductility of stainless steel welds are much improved by passing sufficient nitrogen through the flame by which the welding of the materials is effected. With this invention the surface of the base metal becomes more liquid and freer of oxid under a flame of special characteristics, the molten metal flows quietly, without boiling, does not oxidize readily, and solidifies smoothly, oxids are readily floated away, and the solidified deposits are non-porous.

For welding stainless steel with an oxygen-nitrogen-acetylene flame, we have ascertained that the beneficial range of oxygen to nitrogen ratios is between 70 volumes of oxygen to 30 volumes of nitrogen and 30 volumes of oxygen to 70 volumes of nitrogen. The ratio of oxygen to acetylene is substantially the same as that in ordinary neutral or somewhat carburizing oxyacetylene flames. In order to insure neutrality, it is desirable to adjust the flame so that it shows a slight carburizing feather.

The range of oxygen-nitrogen ratios most effective for the purpose of the invention is from 65 volumes oxygen to 35 volumes nitrogen, to 40 volumes oxygen to 60 volumes nitrogen. A ratio of oxygen to nitrogen approximating 60:40 has proved to be the most practical, the weldability and properties of the weld being excellent and the speed of welding being not slowed unduly as the result of lowered flame temperature.

For better understanding of the invention the following observations on the welding of stainless steel with oxygen-nitrogen-acetylene flames are given:

When a mixture containing 80 volumes of oxygen to 20 volumes of nitrogen is used there is practically no improvement over welding with an oxyacetylene mixture containing no nitrogen. The molten metal boils under the flame.

With an oxygen-nitrogen-acetylene flame in which the oxygen-nitrogen ratio is 70:30, the stainless steel flows with less turbulence than before, but oxids in the path of the flame are removed only when the steel beneath melts.

At a ratio of 60 volumes of oxygen to 40 volumes of nitrogen in the flame, the stainless steel flows quietly. The flame cleans the surface of the base metal before it becomes entirely molten. The weld metal can be built up layer after layer without any trouble.

When the ratio is dropped to 45 volumes of oxygen to 55 volumes of nitrogen, the metal flows still more quietly and is even cleaner, but the speed of welding is considerably slower, while the deposited metal flows more plasticly.

Using oxygen and nitrogen in the proportions of 40 and 60, respectively, the flame temperature is so much lowered that the welder appears to be pouring a very viscous and sluggish material like honey into the weld. The metal is unusually clean, the flame even cleaning out slag inclusions in the base metal.

At an oxygen-nitrogen ratio of about 30:70, the temperature of the flame becomes so low that it is not usable for the purpose of the invention.

The presence of nitrogen in the flame tends to lower the corrosion resistance of the welded joint somewhat. While this effect is not great, we have found that it can be overcome if there is included in the welding rod, or in both the welding rod and the base metal, an agent, such as titanium, which is an inhibitor of intergranular carbide precipitation which is responsible for corrosion of stainless steel welds. Welds made with 18-8 welding rods containing 0.35% titanium showed good corrosion resistance under a test consisting in placing coupons in a boiling solution containing 10% sulfuric acid and 10% copper sulfate for 40 hours and then bending them through a 90° angle with the face of the weld in tension.

In practice, the nitrogen may be supplied to the torch as a third stream, and may be mingled with either the oxygen stream or the acetylene stream, or with the oxyacetylene mixture approaching the tip. An oxygen-nitrogen mixture of proper proportions may be furnished in tanks. Again, the desired proportions of oxygen and nitrogen for the flame mixture may be obtained by using oxygen and air in requisite amounts. The constitution of the mixture fed to the flame is not necessarily confined to the essential constituents, acetylene, oxygen and nitrogen.

We claim:

1. The process of welding alloy steels which are unsuited for welding with the oxyacetylene flame, which comprises fusing such material and making the weld by direct application of heat liberated by the reactions of acetylene and oxygen in a welding gas mixture containing these gases and also a relatively large amount of nitrogen, the ratio of oxygen to nitrogen in the mixture being less than 3 to 1, the nitrogen concentration not exceeding, however, 70% of the sum of the oxygen and nitrogen contents.

2. The process of melting or welding alloy steels which are unsuited for fusing under the oxyacetylene flame, which comprises fusing such alloy steel material by the application of a flame, and maintaining said flame by supplying thereto a mixture containing oxygen, nitrogen and acetylene in which the ratio of oxygen to nitrogen is between 70:30 and 30:70.

3. The process of melting or welding alloy steels which are unsuited for fusing under the oxyacetylene flame, which comprises fusing such alloy steel material by the application of a flame, and maintaining said flame by supplying thereto a mixture containing oxygen, nitrogen and acetylene in which the ratio of oxygen to nitrogen is between 65:35 and 40:60.

4. The process of melting or welding alloy steels which are unsuited for fusing under the oxyacetylene flame, which comprises fusing such alloy steel material by the application of a flame, and maintaining said flame by supplying thereto a mixture containing oxygen, nitrogen and acetylene in which the ratio of oxygen to nitrogen is approximately 60:40.

5. The process of melting or welding alloy steels which are unsuited for fusing under the oxyacetylene flame, which comprises fusing such alloy steel material by the application of a flame, and maintaining said flame by supplying thereto a mixture containing oxygen, nitrogen and acetylene in which the oxygen content is greater than the nitrogen content but not in excess of a ratio of 3:1.

6. The process of melting or welding alloy steels which are unsuitable to be fused under the oxyacetylene flame, which comprises fusing such alloy steel material by subjecting the same to the heat of an acetylene-oxygen flame, while passing nitrogen through said flame in a proportion between 30% and 70% of the sum of the oxygen and nitrogen contents.

7. The process of welding stainless steel which comprises fusing the same with a flame fed by a mixture composed of oxygen, nitrogen and acetylene, in which the ratio of oxygen to nitrogen is between approximately 65:35 and 40:60.

8. The method of increasing the weldability of alloys such as stainless steels under a fusing flame burning acetylene, and also improving the properties of the resulting welds, which comprises mixing nitrogen with oxygen and acetylene and feeding the flame with this mixture, that is to say one in which the oxygen-nitrogen ratio is between 70:30 and 30:70.

9. The process of welding stainless steel which comprises fusing the same with a flame fed by a mixture containing oxygen, nitrogen and acetylene, in which the oxygen-nitrogen ratio is between 70:30 and 30:70, and introducing into the weld an inhibitor of intergranular carbide precipitation.

ROBERT M. ROOKE.
FREDERICK C. SAACKE.